Patented Sept. 15, 1925.

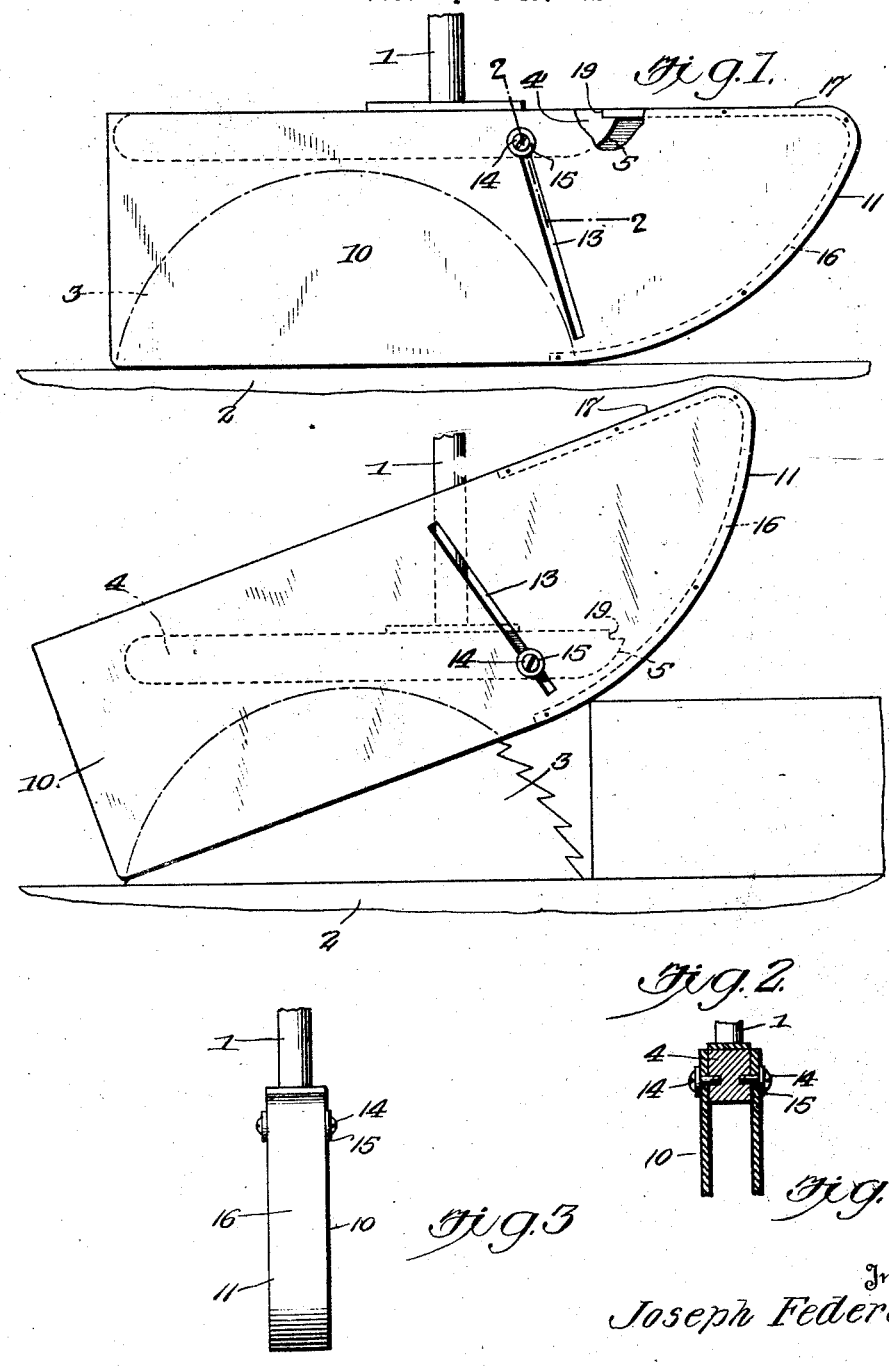

1,553,996

UNITED STATES PATENT OFFICE.

JOSEPH FEDERER, OF SHEBOYGAN, WISCONSIN.

SAFETY SAW GUARD.

Application filed April 19, 1924. Serial No. 707,661.

*To all whom it may concern:*

Be it known that JOSEPH FEDERER, a citizen of the United States, residing at Sheboygan, in the county of Sheboygan and State of Wisconsin, has invented certain new and useful Improvements in Safety Saw Guards, of which the following is a specification.

This invention relates to safety saw guards and it consists in the novel features hereinafter described and claimed.

An object of the invention is to provide a device of the character stated which is adapted to be used over the table of a circular saw and which is provided with means which serve as fenders for preventing the operator from coming in contact with the saw and which at the same time are so mounted and arranged that they permit of the free passage of the board or timber along the saw during the sawing operation. Furthermore the guard will prevent the saw from picking up loose blocks and throwing them as circular saws sometimes do. It will also prevent the saw blade from throwing the dust in a forward direction and toward the operator. Therefore the device keeps the forward portion of the table free from the accumulation of such materials and protects the eyes and person of the operator against injury or harm.

In the accompanying drawing:

Figure 1 is a side view of the safety saw guard.

Figure 2 is a similar view showing how the front end of the saw guard rides over the board or timber, and Figure 3 is a front view of the safety saw guard.

Figure 4 is a vertical transverse section taken on line 2—2 of Figure 1.

The safety saw guard comprises a staff 1 which is attached to the ceiling of the room at a position above the saw table 2 and the circular saw 3. The table and saw are of conventional form and may be of any usual type.

An elongated block 4 is carried at the lower end of the staff and the length of the block is disposed at a right angle to the axis of the staff. The under forward end of the block is bevelled or curved as at 5. The block is positioned above the saw blade and is spaced therefrom and the lower surface of the block is parallel with the upper surface of the table and is spaced therefrom.

Flat plates 10 are mounted at the sides of the block and the ends of the plates project beyond the ends of the block. The under forward ends of the plates are rounded as at 11 and are disposed above the upper surface of the table and the saw.

Each plate is provided at a point between its ends with a slot 13 and the said slots are disposed transversely of the plates and are inclined at acute angles to the median longitudinal dimensions of the respective plates. From the lower edges of the plates the slots are upwardly and rearwardly slanted and the slots are located in advance of the point of attachment of the staff with the block. Bolts 14 are attached to the sides of the block and pass through the said slots and carry at their outer end portions washers 15 which bear upon the outer surfaces of the plates.

Therefore the bolts and their attachments serve as means for guiding the movement of the forward portions of the plates with relation to the block. The plates are restrained and confined to vertical movement only but they may move rearwardly with relation to the block for a distance equal to the slant or bases of the angles at which the slots are slanted.

The forward end of the saw guard is closed by the housing 16 which fits between the upper straight front edges 17 and the under rounded front edges 11 of the plates 10 with its outer face flush with the corresponding edges of the latter. The housing is fastened in place in any suitable manner and the upper rear end thereof fits in a notch or recess 19 formed in the front end of the block 14.

In practice, when a board is placed upon the table and moved toward the saw blade the board passes under the forward edges of the plates and the housing 16 and lifts the saw guard whereby the lower edges of the plates rest upon the upper surface of the board. As the board passes by the saw and the teeth of the saw makes the incision or cut in the board, the saw guard prevents the dusts from being cast forwardly by the saw toward the operator and also prevent the saw from picking up any fragments which might be upon the upper surface of the saw table, and from casting such fragments toward the operator. Therefore a safety saw guard of simple and durable form is provided and the same will effectually protect the operator against the dangers and damages which may be occasioned by throwing the materials as above indicated.

Having described the invention what is claimed is—

A safety saw guard comprising a staff, an elongated block attached to the lower end thereof and disposed at a right angle thereto, the under forward end of the block being bevelled and the upper front corner thereof provided with a notch, plates mounted at the sides of the block and having curved forward ends, means for guiding the plates vertically of the side surfaces of the block, and a housing closing the forward end of the saw guard, said housing fitting between the plates with its outer face flush with the corresponding edges of the latter and its upper rear end fitting in said notch.

In testimony whereof he affixes his signature.

JOSEPH FEDERER.